H. KRAUT.
SHEARING MACHINE.
APPLICATION FILED JUNE 4, 1908.

994,755.

Patented June 13, 1911.
7 SHEETS—SHEET 1.

Fig. 1.

Witnesses:
Harold G. Barrett
Ira J. Morgenthal

Inventor:
Hans Kraut
By Carl M. Crawford
his Atty.

H. KRAUT.
SHEARING MACHINE.
APPLICATION FILED JUNE 4, 1908.

994,755.

Patented June 13, 1911.

Witnesses:
Harold G Barth
Ira J Morgenthal

Inventor:
Hans Kraut
by Carl M. Crawford
his Atty.

H. KRAUT.
SHEARING MACHINE.
APPLICATION FILED JUNE 4, 1908.

994,755.

Patented June 13, 1911.

Witnesses:
N. G. Barrett
Iraj. Morgenthal

Inventor:
Hans Kraut
by Carl H. Crawford
his Atty.

H. KRAUT.
SHEARING MACHINE.
APPLICATION FILED JUNE 4, 1908.

994,755.

Patented June 13, 1911.
7 SHEETS—SHEET 6.

UNITED STATES PATENT OFFICE.

HANS KRAUT, OF CHICAGO, ILLINOIS, ASSIGNOR, BY MESNE ASSIGNMENTS, TO JOSEPH T. RYERSON & SON, A CORPORATION OF ILLINOIS.

SHEARING-MACHINE.

994,755.

Specification of Letters Patent. Patented June 13, 1911.

Application filed June 4, 1908. Serial No. 436,633.

*To all whom it may concern:*

Be it known that I, HANS KRAUT, a subject of the Emperor of Germany, residing at Chicago, in the county of Cook and State of Illinois, have invented a new and useful Improvement in Shearing - Machines, of which the following is a specification.

This invention relates to improvements in shearing machines designated to cut I-beams, H-column beams, channels, angles, T's, flat steel bars and the like into desired lengths.

One of the primary objects of the invention is to provide a machine of this character with shearing reciprocating means so constructed and arranged as to punch or enter the part to be sheared and to subsequently shear or sever such part in one continuous working movement or reciprocation.

A further object of the invention is the provision and arrangement of shear guiding members for the shearing knife adapted to engage the material to be severed at points closely adjacent the cutting or shearing line, and, in the most improved embodiment of the invention, said members coöperate with the shearing knife in severing the material.

A further object of the invention is the provision of means provided with a plurality of beam supporting bolsters or the like, formed to accommodate a variety of sizes of material, and so arranged as to be readily moved into position when different sized beams are to be sheared.

The invention includes many other novel features and details of construction which will be more fully described in connection with the accompanying drawings and will be more particularly pointed out and ascertained in and by the appended claims.

In the drawings.

Like numerals of reference designate similar parts throughout the different figures of the drawings.

Referring to the specific embodiment shown the device of my invention is embodied in a frame structure consisting of reinforced side plates 1 and 2 marginally stiffened and braced as at 3 and 4 and connected at 5, 6, 7, 8 and 9. At its lower front portion there is provided drum supporting base members 10 adapted to be secured to and to support uprights 11. Said uprights 11 may conveniently serve, at points 12, as ways for a shear cross head 13 which, as shown, is provided with members 14 adapted to embrace and slide on said ways to permit reciprocation of said cross head. Removable bearings 15 are mounted on said uprights 11 and support a toggle shaft 16. A toggle, comprising upper and lower joints 17 and 18 respectively, is hung on said shaft 16 and is connected pivotally with the cross head 13 at 19. Said toggle joints 17 and 18 are connected at 20 with each other and with one end of a pitman 21 which is connected at its opposite end at 22 with a crank 23. Said crank 23 is formed on a crank shaft 24 which is provided at one end, and at a point outside of the frame, with a spur gear 25. Said gear 25 meshes with a pinion 26, rigidly secured to a shaft 27, which extends through and projects beyond the frame at the opposite side and is provided with a reduced journal 28. Said shaft also carries a spur gear 29 which meshes with a pinion 30 mounted on a shaft 31, extending through and projecting beyond the opposite side of the frame. At its opposite end said shaft 31 is provided with a loosely mounted spur gear 32 which meshes with a pinion 33 loosely mounted at 28 on the shaft 27. Said pinion 33 is provided with a projecting sleeve 34 upon which is keyed or otherwise non-rotatively secured a belt wheel 35 adapted to be belted to any desirable or convenient source of power, not shown.

It will be seen from the foregoing that the gear reduction is ample to afford a pressure or working stroke of the crosshead and knuckle arrangement sufficient to impart any degree of pressure required to operate the shearing knife on the stock of ordinary or usual thickness. When the knuckle is straightened by the crank the knife is undergoing its shearing stroke and when the knuckle is broken the knife is withdrawn from the stock.

Figures 10, 11, 12, 13, 14:
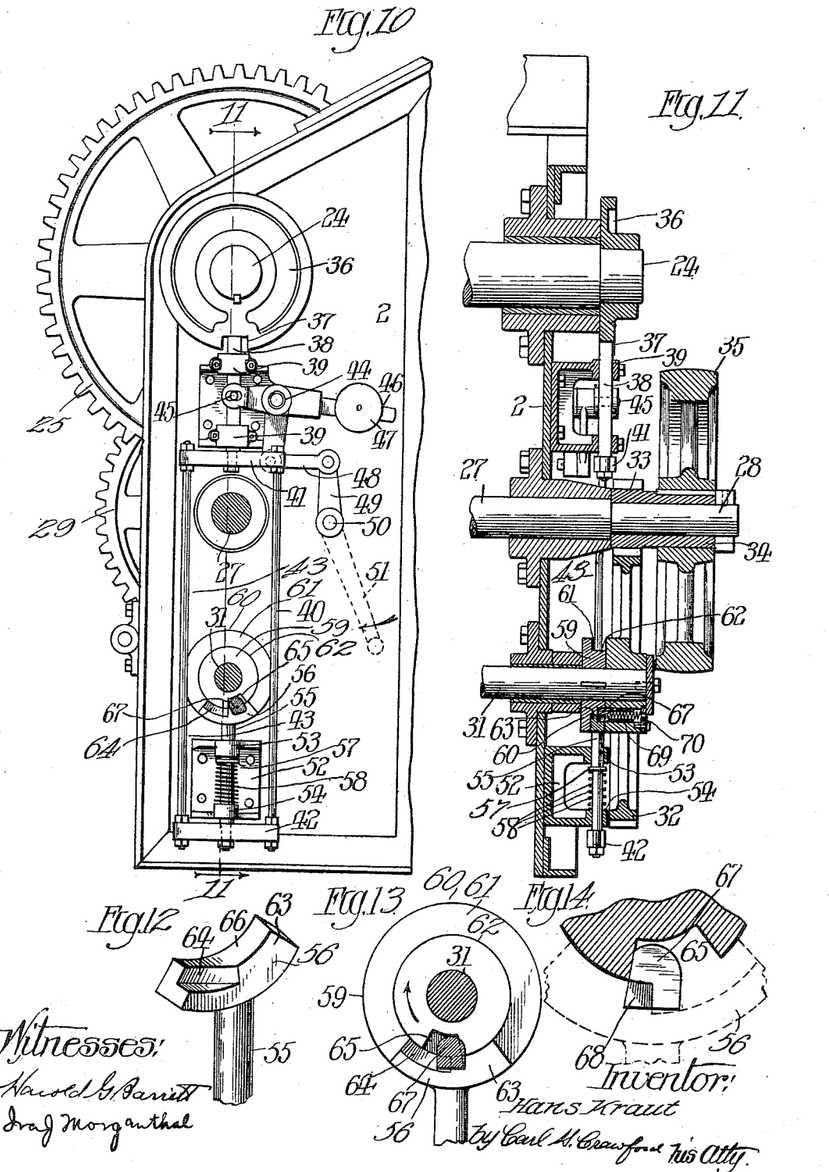
Fig. 10 is a side view of part of the machine showing one form of clutch mechanism.
Fig. 11 is a sectional view on line 11—11 of Fig. 10.
Figs. 12, 13 and 14 are perspective and sectional views respectively of parts of the clutch mechanism.
Figure 18:
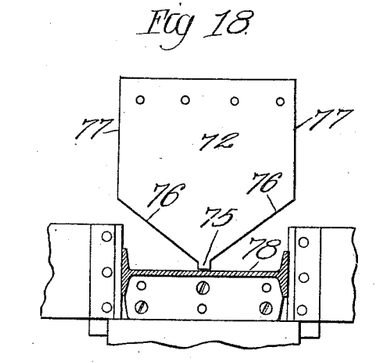
Figs. 18 to 25 are views of two forms of shearing knife illustrating the shearing operation on different sized beams.

The shearing knife, hereinafter described in detail, is mounted on the crosshead 13 and in the present embodiment means are provided for automatically arresting or stopping the machine at the completion of each cycle of movement of the knuckle and crosshead, or in other words at the completion of each revolution of the crank 23. Said means also includes an arrangement for manually throwing the machine into gear when the I-beam or other material to be sheared has been positioned. Referring to the specific embodiment of said means herein shown the same consists of the following parts. A stop disk 36, provided with a notch 37, is keyed to the crank shaft 24 and is adapted to coöperate with arresting mechanism, which as shown, comprises a reciprocating bar 38 mounted in bearings 39 secured to the side frame plate 2. At its lower end said bar 38 is secured to a frame 40 which consists of upper and lower cross bars 41 and 42 respectively, connected by rods 43. A bell crank lever 44 is connected at 45 with the bar 38, and has an extension 46 on which is adjustably mounted a weight 47, the function of which is to counter-balance the weight of the frame 40 and its associated parts so as to reduce to a minimum the manual power required to operate the same. Said bell crank lever 44 is connected by a link 48 with an arm 49 mounted on a rock shaft 50. Said rock shaft 50 extends through the frame and is provided on its opposite end with a manually operable lever 51. A bracket 52 provided with bearings 53 and 54 receives the shank 55 of a cam member 56. A shoulder or washer 57 on said shank 55 provides an abutment for a spring 58 which is interposed therebetween and the bearing 54 and which acts expansively to normally hold the parts in the position shown in Fig. 10, said shank 55 being rigidly secured to the lower cross bar 42. A collar 59 provided with a flange 60 is keyed on shaft 31 and the cam member 56 is so proportioned as to fit the surface 61 and 62 as shown in Figs. 10 and 11. Said cam member 56 is provided with a portion 63 which is flush with the outer face of the collar 59 and adjacent said collar there is formed, in said member 56, a recessed cam portion 64.

The collar 59 is provided with a notch 65 which is open radially adjacent the upper face 66 of said member 56. The spur gear 32 is provided with an axially movable clutch pin 67 disposed so that when it is adjacent the notch 65 it may project therein and lie partially within and partially without the same. The end of said pin 67 is notched at 68 and is inclined so as to engage the cam portion 64. A spring 69 projects into a socket formed in the pin 67 and acts against a removable part 70 to normally force the pin 67 into engagement with the collar 59.

The loosely mounted spur gear 32 is continuously driven by the belt wheel 35 and carries the pin 67 around the collar 59 so that at each revolution the pin 67 will engage the cam surface 64 and will ride upon the surface 63 until it passes the notch 65 so that entrance thereto will be prevented. When the operator desires to shear he will force the lever 51 in the direction of the arrow thereby withdrawing the bar 38 from the notch 37, and also depressing the frame 40 against the resistance of spring 58 thereby forcing the member 56 downwardly and out of the path of the rotating pin 67. It will thus be seen that when said pin 67 reaches said notch 65 it will be forced into the same by spring 69 thereby locking the spur gear 32 to the shaft 31 and effecting operation of the crank and knuckle arrangement hereinbefore described. The bar 38 will now ride upon or engage the periphery of the disk 36 and as the latter completes one revolution the notch 37 will reach the bar 38 and the spring 58 will elevate the frame 40 and force said bar into said notch for arresting movement of the machine when the cross head 13 is at its uppermost position. Such upward movement of the frame 40 will throw the cam member into the path of pin 67 and the latter will ride on the cam 64 until it reaches the surface 63 whereupon it will be withdrawn from the notch 65 thereby throwing the spur gear 32 out of driving connection with the shaft 31.

Figures 4, 15, 16:
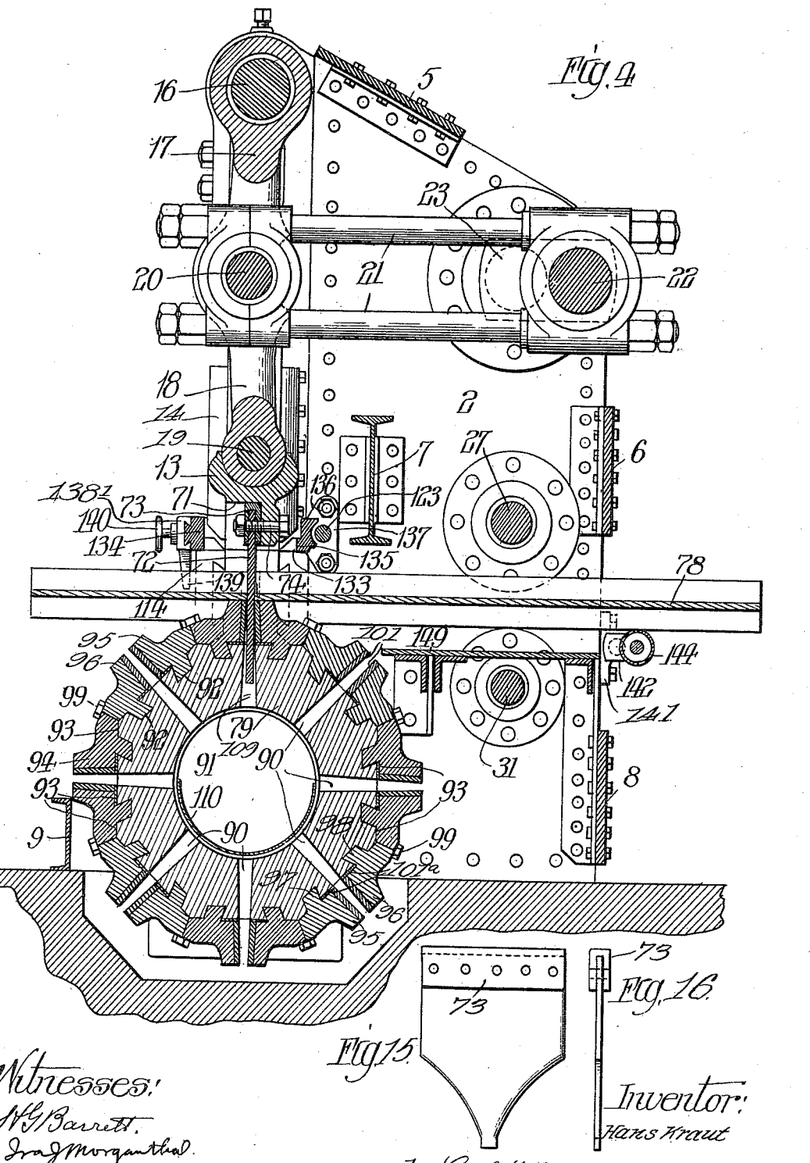
Fig. 4 is a sectional view on line 4—4 of Fig. 1.
Figs. 15 and 16 are side and edge views of one form of shearing knife.

The cross head 13 is recessed at 71 (Fig. 4) to provide a seat for the shearing knife 72. In order to provide a relatively extensive pressure surface between the upper end of the shearing knife 72 and the lower surface of the recess 71 I desirably provide a yoke 73 which in the present embodiment is in the form of a U-shaped strip. Said strip embraces the upper margin of said shearing knife 72 and is held rigidly in its seat by one or more bolts 74. Said shearing knife 72 is provided with punching and shearing portions and said portions are so arranged and disposed that in each single working reciprocation the material to be sheared is first punched and then sheared and in the present embodiment the punching portion of said knife 72 is in the form of a centrally disposed downwardly projecting part 75. At the base or upper end of said punching portion 75 the knife 72 diverges and is provided with inclined shearing portions 76 which terminate at the sides 77 of said knife.

I will next describe the means for supporting the I-beams, indicated at said 78, or other stock to be sheared, during the shearing operation and also the bolsters and like supporting means whereby said stock is supported.

Figures 2, 17:
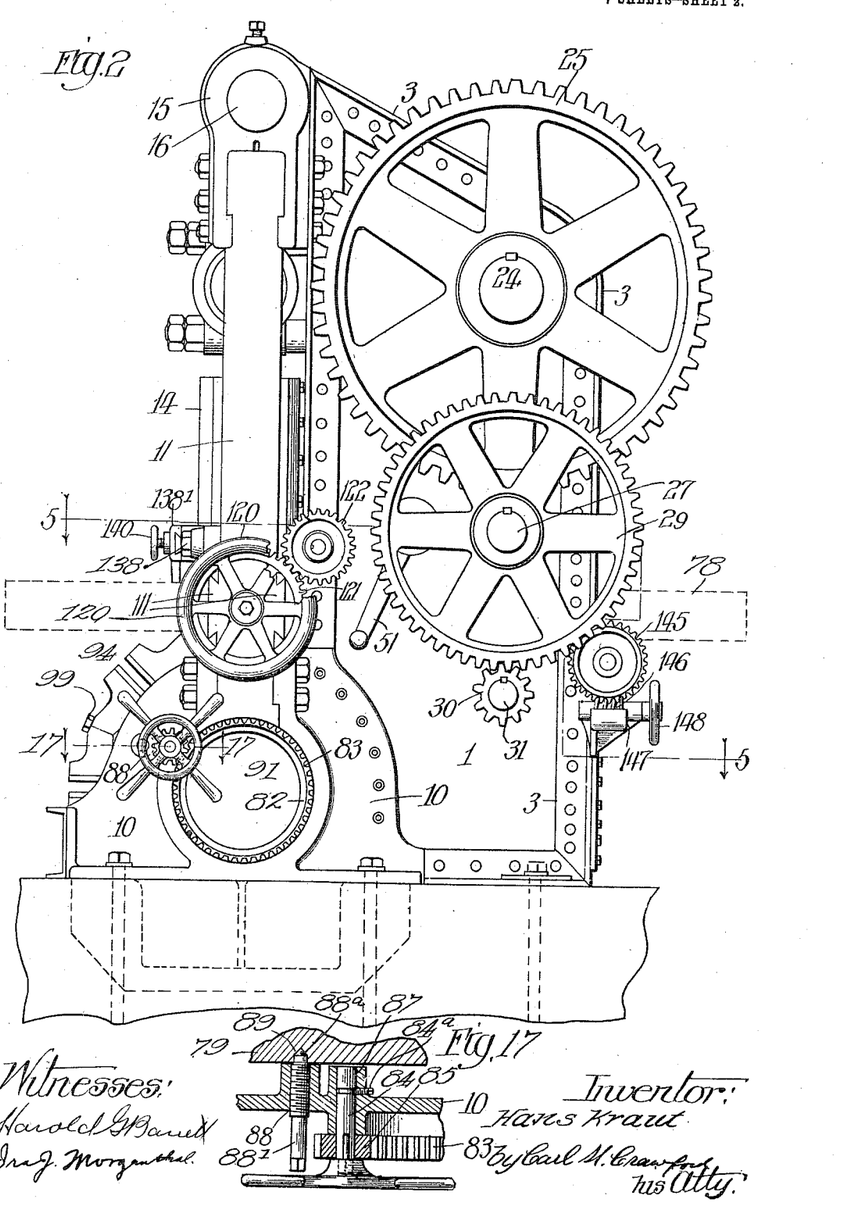
Fig. 2 is a side elevation thereof.
Fig. 17 is a sectional view on line 17—17 of Fig. 2.
Figure 3:
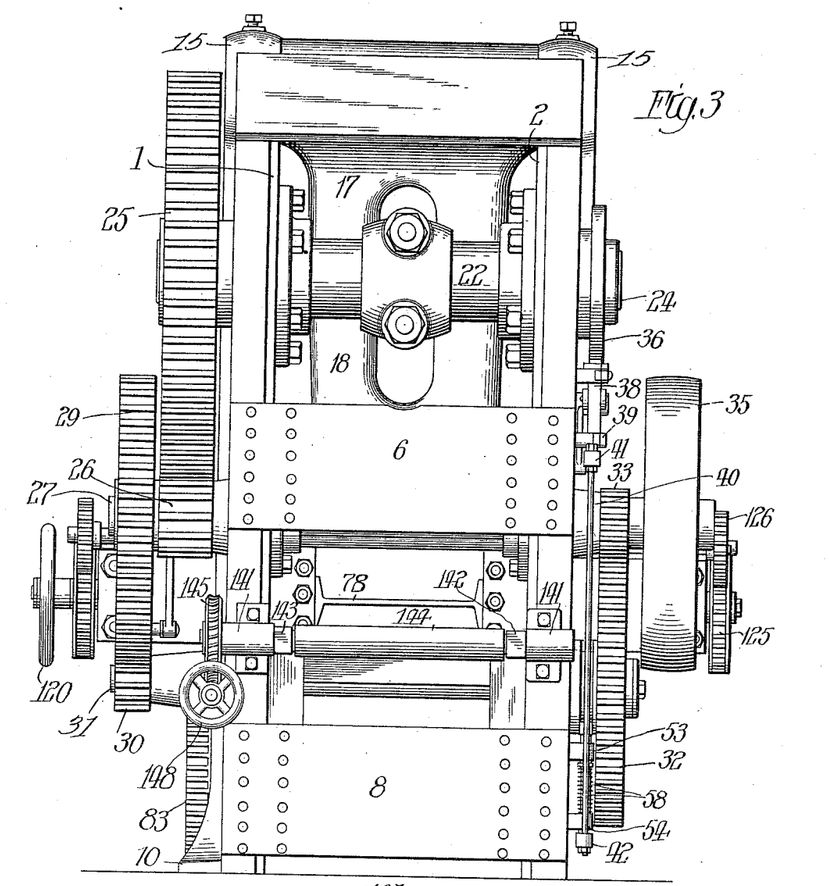
Fig. 3 is a rear elevation.
Figure 7:
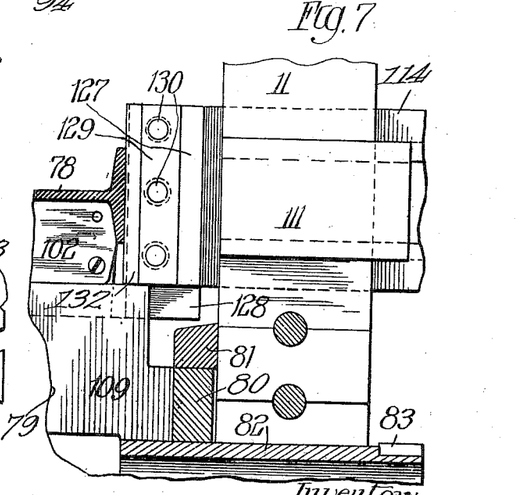
Fig. 7 is a sectional view on line 7—7 of Fig. 5.
Figures 8, 9:
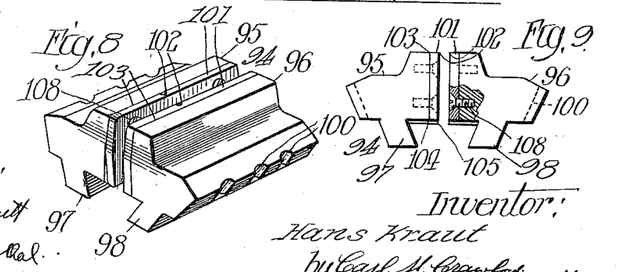
Fig. 8 is a perspective view of one form of bolster.
Fig. 9 is an end view thereof, partly in section.

In the present embodiment of the invention a cylinder or drum 79 is provided and is revolubly mounted in said drum supporting members 10, hereinbefore described. Annular flanges 80 are provided for said drum and said flanges seat and revolve in annular flanges 81, formed on said supporting members 10. Means are provided for rotating the drum and as shown said means comprises a sleeve 82 secured in any desirable manner to the drum 79 and projecting laterally therefrom, said sleeve being provided with an external gear 83 which may if desired be formed integral therewith. A spindle 84, Fig. 17, provided with a pinion 85 is rotatively secured by a pin 84ª in an opening 87 formed in the base member 10 in such a manner as to cause the pinion 85 to mesh with the gear 83. By turning the spindle 84 by means of the star wheel (secured on said spindle 84) the drum can be rotated to any desired position, the purpose of such rotation being hereinafter more fully described. A threaded opening 88 formed in the member 10 is provided to receive a locking screw 88' provided with a conical end 88ª adapted to seat in a similarly formed recess 89 in the drum. The outer end of said locking screw is polygonal and the star wheel hub is formed to fit said screw so that when the drum has been rotated to the desired position the star wheel can be withdrawn from the spindle 84 and fitted on the screw 88' to turn the same into locking engagement with the drum 79. Said drum 79 is provided with a plurality of radially disposed slots or openings 90 extending outwardly from the bore 91 to the periphery of said drum. A plurality of longitudinally disposed grooves 92 are formed in the periphery of said drum at points on opposite sides of said openings 90 and said grooves extend throughout the length of said drum. As shown said drum is octagonal in cross section and is adapted to receive bolsters 94 on its flattened surfaces 93. Said bolsters are formed in two parts or blocks 95 and 96 (Figs. 8 and 9) and each part is provided with a longitudinally disposed projection 97, 98 adapted to snugly fit the grooves 92 and to permit said bolsters to be adjusted to any longitudinal position on the periphery of said drum. Said bolsters are locked in their adjusted position preferably by bolts 99 which extend through registering marginal recess 100, formed in the bolsters and into threaded bores of the drum. The heads of said bolts 99 overhang the abutting margins of said bolsters so that one set of bolts may serve to lock two bolster blocks in position. The length of each pair of bolster blocks will correspond to the different stock sizes of I-beams or H-channels or the like so that when it is desired to shear stock of a different cross-section the operator will rotate the drum to bring the desired size bolster into operative relation with the shearing knife.
The drum is provided with a sufficient number of bolsters to accommodate a variety of sizes of stock but if it is desired to shear stock of an unusual size a special bolster may be provided. As hereinbefore stated two parts or blocks, constituting a bolster, are located on opposite sides of each opening 90 and preferably said blocks will be located in a central position lengthwise of the drum so as to extend radially therefrom and supportingly engage the web and flange portions of the I-beam on the lower side thereof as clearly shown in Figs. 4 and 7 so that the I-beam will be supported and prevented from moving laterally on said bolsters and held out of engagement with the drum.

Figure 1:
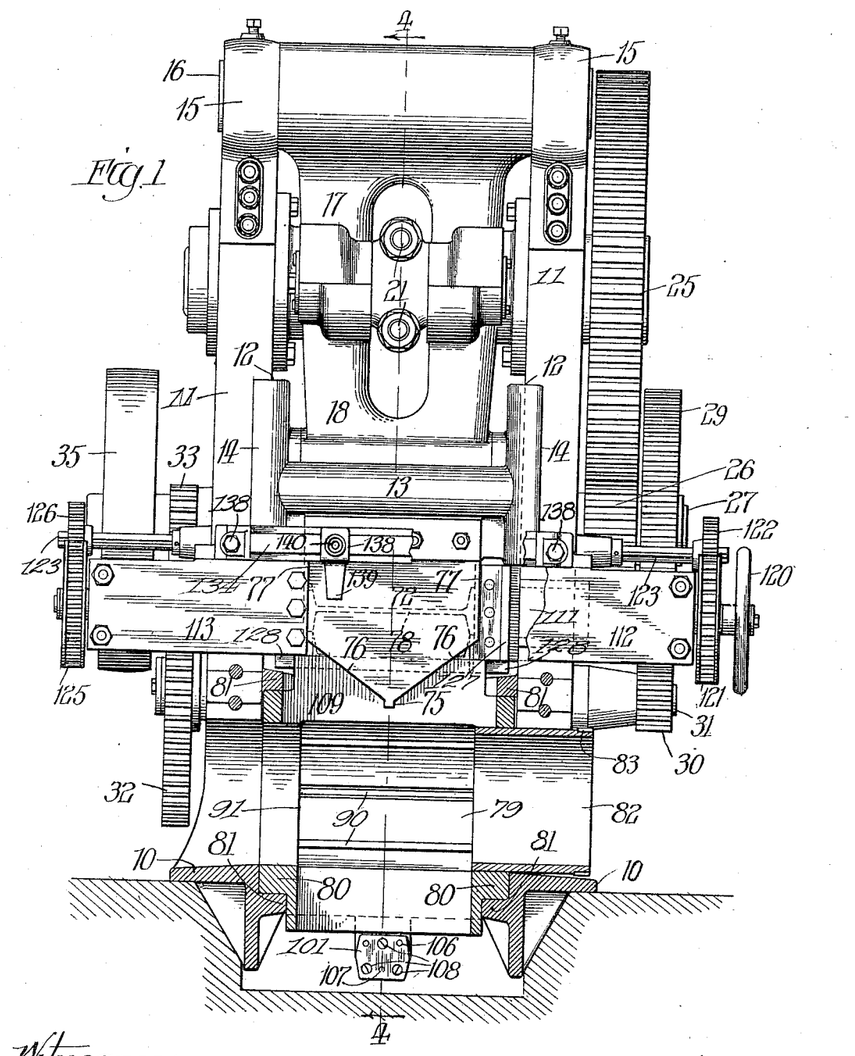
Figure 1 is a front elevation, with parts in section, of a machine embodying one form of my invention.

In cases where the bolsters are utilized to assist in the shearing operation their inner opposing faces may be provided with shearing plates 101 adapted to lie closely adjacent the shearing knife on opposite sides thereof and assist the same in effecting a sharp clean shearing cut. Preferably the adjacent inner faces of the bolster blocks converge from their lower to their upper margins so that the upper margins of the shearing plates will lie in close proximity to the opposite faces of the knife while the lower margin of said shearing plates will be separated therefrom by a slight clearance which arrangement insures an effective action of the shearing corners 102. In the most improved embodiment of the invention each shearing plate is provided with shearing corners 102, 103, 104 and 105 (Figs. 8 and 9) and means are provided for mounting said shearing plates on the bolster blocks so that when one shearing corner becomes dull the plate may be reversed endwise to bring the rear upper corner into a shearing position and when both of the upper corners on each side of the plate have become dull the plate may be reversed to bring its used face against the block and its other face adjacent the knife so that both of its opposite shearing corners may be utilized. As shown in Fig. 1 each shearing plate is provided with six openings 106 and 107 and three screws 108 pass through said openings into the bolster blocks to secure the plate in position. In view of the fact that the greatest strain is imposed on the upper or active portions of said shearing plates two or more screws engage the plate nearest its operating margin while only one screw engages said plate near its lower or non-acting margin. It will be readily seen that the disposition of the openings 106 and 107 is such as to enable the operator to reverse the shearing plates so that in any position to which they may be adjusted, to bring the four cutting corners into a shearing position, the three screws described will register with the openings and will serve to anchor the plates. When it is desired to reverse or renew the shearing plates or when it is desired to put in a different sized bolster the bolts 99 will be removed to permit the blocks to be slid lengthwise of the drum out of the slots 92.

All of the openings 90 are the same length except for the opening adjacent to the longest bolster which opening is indicated at 109 and said opening extends laterally beyond the remaining openings so as to receive the shearings and permit the same to fall into the central bore 91. A suitable basket or other form of receiver 110 (Fig. 4) may be supported in the bore 91 so as to receive the shearings and prevent them from passing downwardly through the lower openings 90 and clogging the mechanism. Thin steel plates may be interposed between the shearing plate 101ª and drum to protect the latter as clearly shown in Fig. 4.

In order to insure a sharp clean shearing action of the flanges of the I-beam or other stock means are desirably provided for gripping the stock on both sides of and closely adjacent the course of the shearing knife and in the most improved embodiment of the invention said means includes shearing members which coöperate with the knife and I desirably make said means adjustable to accommodate stock of different size. In the embodiment shown said means when adjusted in position also serve to lock the drum non-rotatively and may if desired be substituted for the locking spindle hereinbefore described.

Figure 5:
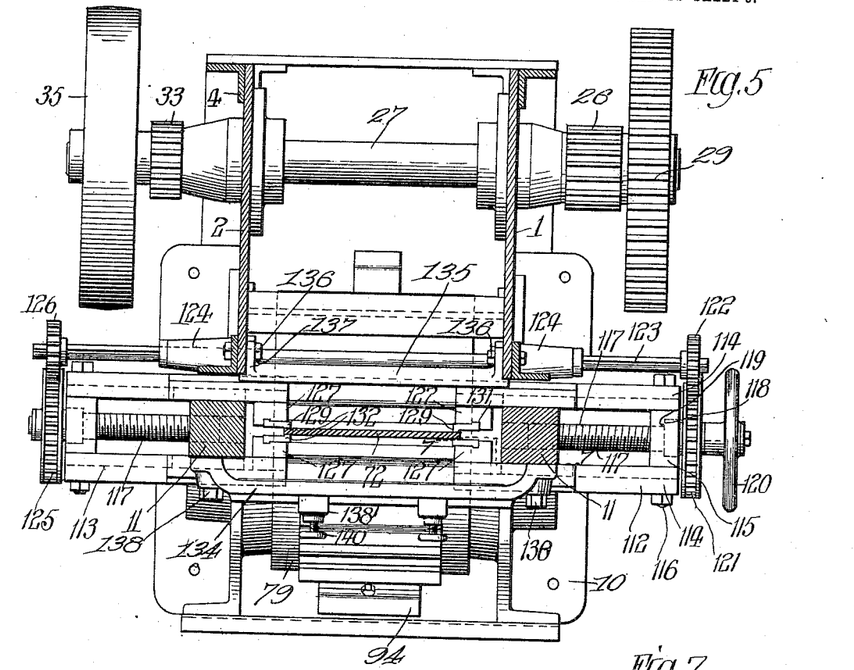
Fig. 5 is a sectional view on line 5—5 of Fig. 2.
Figure 6:
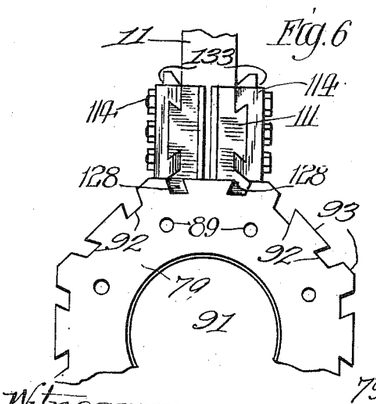
Fig. 6 is an end view of a drum and coöperating parts.

Referring specifically to the embodiment shown, the uprights 11 are each provided with oppositely disposed ways 111, preferably dovetailed in cross section and are designed to support shear carriers in the form of frames 112 and 113 (Fig. 5) and inasmuch as said frames are alike only one need be described in detail. Referring to the frame 112 the same comprises laterally disposed bars 114 united at their outer ends by a block 115 and bolts 116. Said bars 114 are grooved to slide on said ways 111. An adjusting screw 117 has threaded engagement with a bore in one of the uprights 11 and passes through said blocks 115 and is adapted to rotate freely therein. A shoulder 118, formed on the screw 117 engages a shoulder 119 in the block 115 so that when screw 117 is turned to the right the frame 112 will be forced inwardly toward the stock. On its outer end said screw 117 is provided with a hand wheel 120 for turning said screw. It is advantageous to adjust the carrier frames 112 and 113 in unison so that the operator will not only save time but will always be sure that the stock is centrally adjusted lengthwise of the drum and is gripped by uniform pressure on both sides. To this end a flanged gear wheel 121 is rigidly secured to said screw 117 between the block 115 and the hand wheel 120 and said gear meshes with a pinion 122 slidably mounted or splined on a shaft 123 which extends through bearings 124 to the opposite side of the machine. A flanged gear 125 is mounted on the opposite screw 117 and meshes with a pinion 126 splined on said shaft 123. The flanges of said gears 121 and 125 laterally engage the pinions 122 and 126 and shift the same on the shaft 123 so as to maintain a mesh engagement in any position to which the frame may be adjusted. It will thus be seen that by turning the hand wheel 120 the said carrier frames will be adjusted in unison. Shear blocks 127 are bolted or otherwise secured to the inner ends of said bars 114 of the carriers and said blocks are provided with projections 128 adapted to fit the grooves 92 so that when the carriers are adjusted to an operative position said projections 128 will enter the ends of the grooves 92 and thereby serve to lock the drum 97 in its adjusted position. Shear plates 129 are removably secured by bolts or other suitable means to the blocks 127 and as shown said plates 129 are locked by the bolts 130 which secure the blocks 127 to the bars 114. Said plates 129 are provided with projections 131 (Fig. 5) which seat in recesses formed in the blocks 127 so that when said plates 129 are secured in place the structural abutment of the projections 131 will relieve the bolts 130 and will transmit the strain to the blocks 127. The shearing plates 129 project inwardly slightly beyond the inner faces of the blocks 127 so as to engage the outer lateral faces of the I-beam or other stock to be sheared and assist in holding the same in place. Each of said shearing plates is provided with an inwardly projecting margin 132 adapted to engage the lateral margins of the shearing knife 72 and guide the same during the shearing operation. The projecting portions 132 and 131 act as shearing members in connection with the shearing portion 76 of the knife 72 and the plates 129 are, like the plates 101, preferably formed of hardened steel with sharpened shearing corners or margins. The plates 129 are reversible so that when shearing portions 132 become dull the plates may be reversed to bring part 131 into a shearing position. The blocks 127 and also the bars 114 are so proportioned as to support the plates 129 throughout their length and the length of the latter is such that said plates will engage the knife 72 substantially throughout the shearing action. I desirably provide shearing plates long enough to engage the flanges of I-beams or H-channels of the largest size.

The projections 128 engaging the grooves 92 will prevent lower portion of the shearing plates 129 from spreading should the knife 72 have any tendency to swerve from its course and said projections will rigidly hold said plates 129 in engagement with said knife. In order to insure the same rigidity at the upper portions of said plates 129 I desirably recess the bars 114 at 133 to receive transverse brace bars 134 and 135. The sliding engagement thus afforded securely holds the upper portions of the shearing plates 129 into engagement with the knife 72 and the rigidity of the blocks 127, thus braced above and below, will be sufficient to maintain intermediate portions of the shearing plates 129 in engagement with said knife 72. The rear brace bar 135 is anchored at 136 to the side plates 1 and 2 and is provided with an opening in its flange 137 to accommodate the shaft 123. The front brace bar 134 is bolted at 138 to the uprights 11.

In order to prevent the I-beam from being raised off from the bolster blocks when the knife 72 is being withdrawn retaining means is provided which as shown consists of blocks 138' provided with a dovetailed sliding connection with the bar 134 and having downwardly projecting fingers 139 extending toward the stock, preferably the web portion thereof, in a manner to engage the same and prevent it from being lifted by the knife. Said blocks 138 may be locked in their adjusted positions by turning the hand wheel 140, the shanks of which may have threaded engagement with the blocks 138' and engage with their ends brace bar 134.

In order to support the stock at the rear of the machine so that it will lie in a substantially horizontal position and at right angles to the line of movement of the knife 72, means is provided, which is adjustable to accommodate different sized stock, and in the most improved embodiment of the machine the adjusting feature is so arranged so that when adjustment is effected the member engaging the stock will be locked in its position of adjustment.

Referring to the specific embodiment shown bearings 141 are secured at the rear of the machine and support cranks 142 and 143. A roller 144 is mounted on said cranks and is adapted to be held thereby in a position to support the stock. The crank 143 carries on its outer end a worm wheel 145 which meshes with a worm 146 mounted in a bearing 147 and adapted to be operated by a hand wheel 148. It will be seen from the foregoing that the worm gearing will serve effectively to lock the roller after the same has been adjusted and it will also be obvious that the roller 144 may be readily adjusted to a high, low or intermediate position in accordance with the size of the stock to be sheared.

When stock is to be sheared in relatively short lengths it is desirable to prevent the severed ends from descending to points about the drum 79 and to this end I desirably provide a table 149 in the rear of the drum 79 to catch and support short ends of stock that do not extend to the roller 144.

Figure 19:
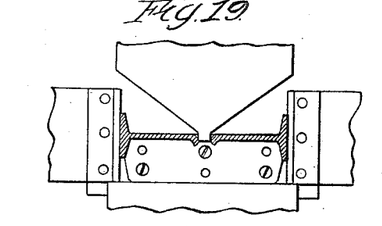
Figure 20:
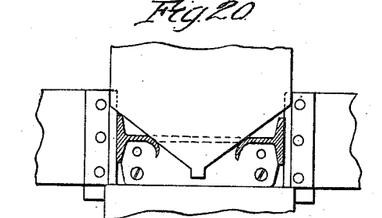
Figure 21:
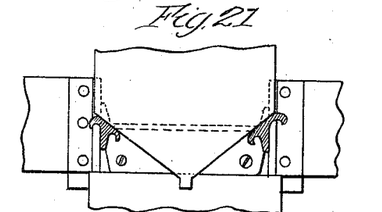
Figure 22:
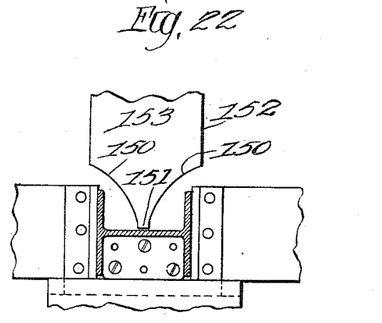
Figure 23:
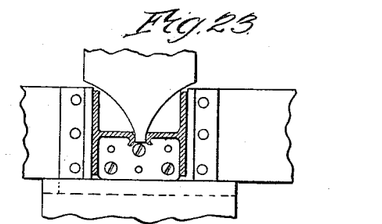
Figure 24:
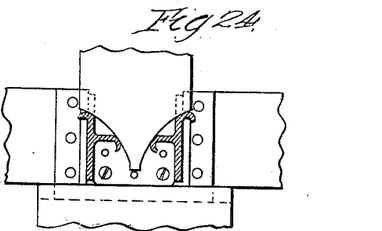
Figure 25:
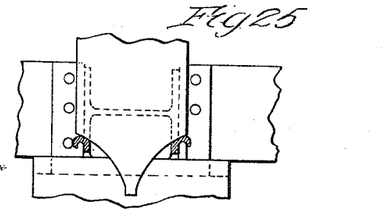

Next referring to the specific knife constructions shown in Figs. 18 to 25 inclusive and first referring to the form shown in Figs. 18 to 21 it will be seen that the knife 72 is similar to that hereinbefore described having a body portion provided with the downwardly projecting punching portion 75 and the shearing portions 76 receding from the punching portion to the lateral margins 77 of the body portion 72. In shearing an I-beam for example the part 75 will first enter or punch the web of the I-beam 78 to form a relatively restricted opening therein, as shown in Fig. 19. This punching action will require a relatively limited amount of power and will precede the shearing action as the latter cannot take place until after the portion 75 has entered the stock. By this construction it will be seen that the stock itself forms a guide for the shearing knife and will effectively prevent the same from swerving from its true course. After the stock has been punched the shearing portions commence to shear the same from the opening formed by the punch and therefore throughout the shearing action the shearing portions are not relied upon to effect an entrance through the stock. By the diverging inclined shearing portions 76 the stock is sheared outwardly in both directions from a central point and there is no tendency to displace the stock during the shearing operation.

Next referring to the form shown in Figs. 22 to 25 inclusive it will be seen that the shearing margins 150 are curved from their juncture with the punching portion 151 to the lateral margins 152 of the body portion 153. This form of shearing knife is especially designed for H-columns and like forms of stock wherein the central portions first engaged by the punch are disposed between relatively high flanges. It will be seen by reference to Fig. 23 that the punch 151 will enter the web before the shearing portions engage the flanges thereby serving to guide the knife at the beginning of its shearing movement. The substantially wedge shaped formation of both types of knives provide for a perfect shearing action as the shearing portions perform their function wholly with a draw cut.

I claim—

1. A shearing machine comprising, in combination, a reciprocable blade, bottom blades with which the reciprocable blade coöperates and side blades arranged in pairs, one at each end of the bottom blades and between which the sides of the reciprocable blade passes, the side blades of each pair being separately mounted and being adjustable toward and from the vertical center of the reciprocable blade, and means for holding the side blades of each pair from spreading apart.

2. A shearing machine comprising, in combination, a reciprocable blade, bottom blades with which the reciprocable blade coöperates and side blades arranged in pairs, one at each end of the bottom blades and between which the sides of the reciprocable blade passes, supporting means for the side blades on which the blades of each pair are separately mounted, said supporting means serving as clamps to act sidewise against the work and being adjustable toward and from the work, and guides for said supporting means arranged to hold the side blades of each pair from spreading apart.

3. A shearing machine comprising, in combination, a reciprocable blade, bottom blades, side blades, the latter arranged in pairs, one at each end of the bottom blades, frames for carrying the side blades, each comprising two arms, arranged one on each side of the plane of the reciprocable blade and each having separate guiding engagement with the machine frame, the side blades of each pair being separately mounted on the inner ends of the arms of said carrying frame.

4. A shearing machine comprising, in combination, a reciprocable blade, bottom blades, side blades, the latter arranged in pairs, one at each end of the bottom blades, frames for carrying the side blades, each comprising two arms, arranged one on each side of the plane of the reciprocable blade and each having separate guiding engagement with the machine frame, shear blocks separately mounted on the inner ends of said arms and adapted to be clamped against the sides of the work, the side blades of each pair being separately mounted on said blocks.

5. A shearing machine comprising, in combination, a reciprocable blade, bottom blades, side blades, the latter arranged in pairs, one at each end of the bottom blades, frames for carrying the side blades, each comprising two arms, arranged one on each side of the plane of the reciprocable blade and each having separate guiding engagement with the machine frame, shear blocks separately mounted on the inner ends of said arms and adapted to be clamped against the sides of the work, the side blades of each pair being separately mounted on said blocks, and adjusting means acting on said carrying frames in the plane of the reciprocable blade for pressing the blocks against the work.

6. A shearing machine comprising, in combination, a reciprocable blade, bottom blades, side blades, the latter arranged in pairs, one at each end of the bottom blades, frames for carrying the side blades, each comprising two arms, arranged one on each side of the plane of the reciprocable blade and each having separate guiding engagement with the machine frame, shear blocks separately mounted on the inner ends of said arms and adapted to be clamped against the sides of the work, the side blades of each pair being separately mounted on said blocks, and adjusting screws arranged with their axes in the plane of the reciprocable blade for adjusting the blocks toward the work.

7. A shearing machine comprising, in combination, a reciprocable blade, bottom blades, side blades, the latter arranged in pairs, one at each end of the bottom blades, frames for carrying the side blades, each comprising two arms, arranged one on each side of the plane of the reciprocable blade and each having separate engagement with the machine frame, shear blocks separately mounted on the inner ends of said arms and adapted to be clamped against the sides of the work, the side blades of each pair being separately mounted on said blocks, and adjusting screws arranged with their axes in the plane of the reciprocable blade for adjusting the blocks toward the work and means for rotating the adjusting screws in unison to simultaneously adjust the blocks against the work.

8. A shearing machine comprising, in combination, upright frame members, bottom blades arranged between said upright frame members, a reciprocable blade coöperating with the bottom blades, side blades arranged in pairs, one pair at each end of the bottom blades, carrying frames for the side blades, each having arms arranged to straddle the upright frame members and on the inner ends of which the side blades are carried and means acting on said frames for adjusting the side blades toward and from each other.

9. A shearing machine comprising, in combination, upright frame members, bottom blades arranged between said upright frame members, a reciprocable blade coöperating with the bottom blades, side blades arranged in pairs, one pair at each end of the bottom blades, carrying frames for the side blades, each having arms arranged to straddle the upright frame members and on the inner ends of which the side blades are carried, means acting on said frames for adjusting the side blades toward and from each other, and means for preventing the inner ends of said arms and the blades carried thereby from spreading apart.

10. The combination with a shearing blade and its support to which the blade is bolted, said blade being provided at its opposite sides with thickened shearing edges one of which projects from one side and the other from the other side of the plane of the blade, and the support being provided with a thrust shoulder adapted for engagement with one thickened edge of the plate when the other edge thereof is in operative position for work, and the blade being reversible on its support to engage either of said thickened shearing edges with said shoulder.

11. A shearing machine comprising, in combination, bottom blades, a reciprocable blade coöperating therewith, side blades at the ends of the bottom blades, said side blades being each provided at its sides with shearing edges which project in opposite directions from the plane of the blade, supports for the side blades to which the side blades are bolted and having shoulders to engage the shearing edges at the outer edges of the side blades when the inner shearing edges are in position for work, whereby the attaching bolts are relieved from shearing stress, said side blades being capable of being reversed on their supports to engage either shearing edge of each blade with its associated shoulder.

12. A shearing machine comprising, in combination, a reciprocable shearing blade, means for operating the blade, a plurality of pairs of bottom blades, an adjustable support for the bottom blades and clamping means for holding the work arranged to lock the bottom blade support in adjusted positions.

13. A shearing machine comprising, in combination, a reciprocable shearing blade, an adjustable work support, a plurality of sets of bottom blades carried by said support and adjustable clamping means for holding the work laterally in position, provided with means for locking the support rigidly in position, with one set of bottom blades coöperatively alined with the reciprocable and side blades.

14. A shearing machine comprising, in combination, a reciprocable shearing blade, an adjustable work support, a plurality of sets of bottom blades carried by said support, side shear blades and blocks by which the side blades are carried provided with means for locking the support in adjusted position, with one set of bottom blades coöperatively alined with the reciprocable and side blades.

15. A shearing machine comprising, in combination, a reciprocable shearing blade, an adjustable work support, a plurality of sets of bottom blades carried by said support, clamping blocks movable toward and from the work and arranged to hold it laterally in position, side blades carried by said clamping blocks and interlocking connections between said blocks and work support arranged to lock the latter in position, with one set of bottom blades coöperatively alined with the reciprocable and side blade.

16. A shearing machine comprising, in combination, a reciprocable shearing blade, a rotative work support carrying a plurality of pairs of bottom blades, work holding means provided with means for locking the rotative support in adjusted positions and side blades carried by the work holding means arranged to coöperate with said reciprocable and side blades.

17. A shearing machine comprising, in combination, a reciprocable shearing blade, a rotative work support carrying a plurality of pairs of bottom blades, a pair of side blades at each end of the support and means for locking said work support in position to aline one pair of bottom blades with the side blades, and for holding the side blades from spreading apart.

18. A shearing machine comprising, in combination, a reciprocable shearing blade, a grooved rotative work support, a plurality of bolsters having interlocking engagement with the grooves of the support, bottom shearing blades carried by the bolsters with which the reciprocable blade coöperates, side shearing blades and supports for the side shearing blades provided with projections adapted to enter the grooves of the rotative work support to lock it in any desired adjusted position.

19. A shearing machine comprising in combination, a shearing knife, means for operating said knife, a rotatable drum provided with a plurality of radially disposed knife receiving openings, a plurality of two part bolsters removably mounted on the periphery of said drum and forming continuations of said openings, and means for rotating and locking said drum to bring any desired bolster into operative relation with said knife.

20. A shearing machine comprising in combination, a shearing knife, means for operating said knife, a rotatable drum provided with a plurality of radially disposed knife receiving openings, removably mounted bolster blocks spaced apart from each other to permit passage of said knife through said openings and support the work, and shearing plates reversibly secured to said blocks.

21. A shearing machine comprising in combination, a shearing knife, means for operating said knife, a rotatable drum, bolster blocks mounted on said drum and spaced apart from each other to receive the knife, and shearing plates reversibly mounted on said blocks.

22. A shearing machine comprising in combination, a shearing knife, means for operating said knife, a rotatable drum, peripherally disposed work supporting bolster blocks mounted on said drum and spaced apart to receive said knife, and shearing plates, each provided with four cutting corners or margins, reversibly mounted on said blocks.

23. A shearing machine comprising in combination, a shearing knife, means for operating said knife, a rotatable drum provided with a plurality of different sized work supporting elements and a plurality of locking openings and a gear, a stationary member provided with an opening adapted to register with said locking openings and an additional opening, and a spindle provided with a gear and hand wheel and adapted to be inserted in one of said openings and act through said gears to rotate said drum and a locking screw for the other of said openings adapted to engage one of said drum openings.

24. A shearing machine comprising in combination, a shearing knife, a support for the work adjacent thereto, an auxiliary support comprising a pivotally mounted member, and worm gear adjustment therefor serving to adjust and lock said member in its adjusted position.

25. A clutch mechanism comprising in combination, a continuously driven member provided with a spring actuated pin, a shaft provided with a rigidly mounted collar having a recessed or notched portion adapted to receive said pin, a cam member serving normally to maintain said pin out of engagement with said recess, and manually operable means for withdrawing said cam member from operative proximity with said pin thereby permitting engagement thereof with said collar.

26. A clutch mechanism comprising in combination, a continuously driven member provided with a spring actuated pin, a normally stationary member provided with a pin engaging portion and adapted to be operated by engagement of the pin therewith, a spring controlled cam member serving normally to prevent engagement of said pin with said engaging portion, and means for withdrawing said cam member from operative proximity of said pin to permit engagement thereof with said engaging portion.

27. A clutch mechanism comprising in combination, a continuously driven member provided with a clutch pin, a driven shaft provided with a collar having a pin engaging portion, a cam member serving to normally prevent engagement of said pin with said engaging portion, a second shaft operatively connected with said driven shaft and provided with a stop member, an element adapted to coöperate with said stop member, a counter balance spring controlled frame connected with said element and cam member, and means for disengaging said element with said stop member and withdrawing said cam member from operative proximity to said pin.

In testimony whereof I affix my signature in presence of two witnesses.

HANS KRAUT.

Witnesses:
E. A. SINGER,
CARL H. CRAWFORD.